United States Patent
Greider

[11] 3,949,661
[45] Apr. 13, 1976

[54] SAFETY MEANS FOR A SKINNING AND/OR SLASHING MACHINE

[75] Inventor: Charles Austin Greider, Des Moines, Iowa

[73] Assignee: Townsend Engineering Company, Des Moines, Iowa

[22] Filed: Apr. 24, 1974

[21] Appl. No.: 463,537

[52] U.S. Cl. ............... 99/589; 17/21; 83/DIG. 1; 83/544; 99/584; 192/130
[51] Int. Cl.² ......................................... A22B 5/16
[58] Field of Search ........... 99/589, 584; 83/DIG. 1, 83/544–546, 58, 155, 508.2; 74/609, 613; 192/130, 131 R, 129 A; 200/61.41; 100/53; 17/21, 25

[56] References Cited
UNITED STATES PATENTS

| | | | |
|---|---|---|---|
| 580,130 | 4/1897 | Herschel | 83/508.2 |
| 2,724,350 | 11/1955 | Rerucha | 83/155 |
| 2,912,027 | 11/1959 | Townsend | 99/589 |
| 3,398,772 | 8/1968 | Llein | 83/546 |
| 3,650,650 | 3/1972 | Cook | 100/53 |
| 3,698,527 | 10/1972 | Wiggers | 200/61.41 |
| 3,805,658 | 4/1974 | Scott | 100/53 |

Primary Examiner—Robert Jenkins
Assistant Examiner—James A. Niegowski
Attorney, Agent, or Firm—Zarley, McKee, Thomte & Voorhees

[57] ABSTRACT

A safety means for a skinning and/or slashing machine having a frame means with a skinning blade means mounted thereon which provides skin from the meat product to be skinned as the meat product is moved therepast. A plurality of spaced apart slashing blades are rotatably mounted on the frame means adjacent the skinning blade means and are adapted to slash the meat product to permit the inspection thereof. The blades are supported by a pair of support arms which are pivotally connected to the frame means so that the blades may be moved upwardly away from the skinning blade means. A first normally closed switch means is provided on the frame means and is adapted to deactivate the machine power supply when the support arms are pivotally moved to their raised positions. A transparent safety shield is secured to the support arms and extends over the blades. An inverted U-shaped safety guard extends over the feed conveyor to prevent the machine operator from extending his hands too far towards the skinning blade. The safety guard is supported by a pair of spaced apart U-shaped posts secured to the frame means. A shaft is rotatably supported by the U-shaped post at the feed end of the machine and has a safety bar secured thereto which extends across the feed end of the safety guard. A cam is secured to the shaft and has an arcuate cut-out portion provided therein which is in engagement with a roller provided on a second normally closed switch means mounted on the frame means. Vertical movement of the safety bar causes the second switch means to deactivate the power supply source for the machine.

17 Claims, 7 Drawing Figures

SAFETY MEANS FOR A SKINNING AND/OR SLASHING MACHINE

BACKGROUND OF THE INVENTION

Skinning machines such as those described in Reissue No. 23,222; U.S. Pat. No. 2,522,728; and U.S. Pat. No. 2,912,027 are employed to remove the skins from meat products such as pork jowls, pork bellies or the like. It is necessary that the pork jowls be inspected for abscesses and the machine disclosed in U.S. Pat. No. 2,912,027 provided a slashing means which slashed the pork jowls along the entire width thereof to expose any abscesses which were present in the jowls.

A problem connected with the use of skinning and/or slashing machines is that the machine operator could be injured if he extended his arm or hand into the machine or if the operator's hands came into contact with the slashing blades.

Therefore, it is a principal object of this invention to provide a safety guard means for a skinning and/or slashing machine.

A further object of the invention is to provide a safety guard for a skinning and slashing machine which deactivates the machine if the operator should extend his arm too far into the machine.

A further object of the invention is to provide a safety guard for a skinning and slashing machine which does not interfere with the normal operation of the machine.

A further object of the invention is to provide a safety guard for a skinning and slashing machine which is transparent to permit the machine operator to observe the skinning and slashing operation.

A further object of the invention is to provide a safety means comprising a pair of safety guards or shields for a skinning and slashing machine.

A still further object of the invention is to provide a safety means for a skinning and slashing machine which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figures 1, 2:
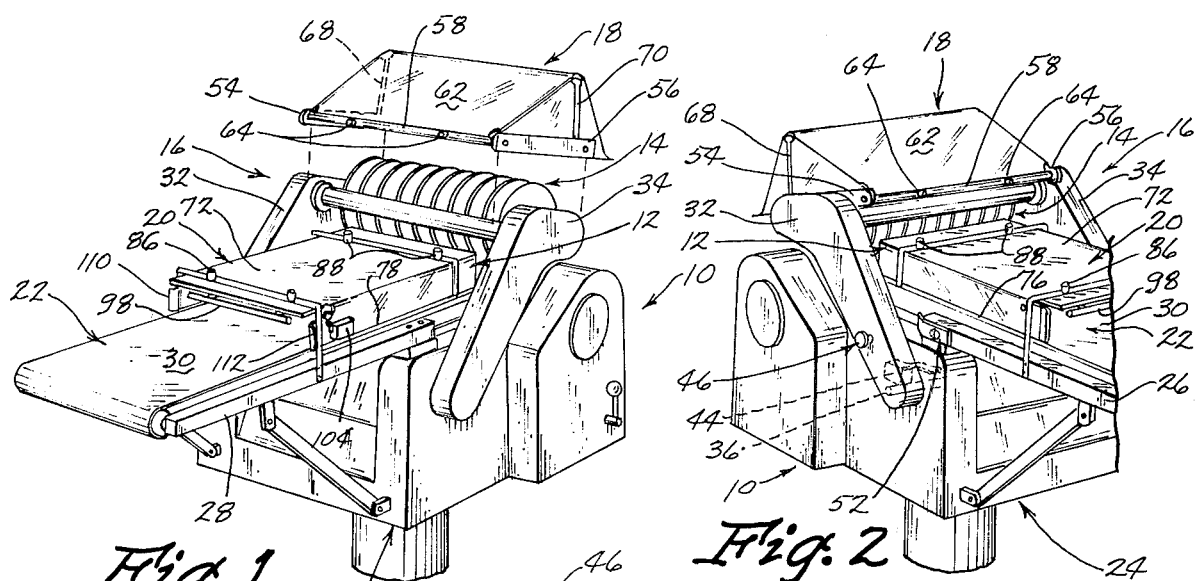
FIG. 1 is a perspective view of a skinning and slashing machine having the safety means of this invention mounted thereon.
FIG. 2 is a perspective view of the machine.

Referring now to the drawings, the numeral 10 generally designates the skinning and slashing machine of this invention generally comprising a skinning apparatus 12 and a slashing apparatus 14. The skinning apparatus 12 is conventional in design and is of the type manufactured by Townsend Engineering Company of Des Moines, Iowa. The safety means of this invention is referred to generally by the reference numeral 16 and comprises a safety shield or guard 18 which is mounted on the slashing mechanism 14 and a safety guard or shield 20 which is mounted on the machine over the feed conveyor adjacent the feed end thereof. The details of the skinning apparatus are not critical to this invention and it should be understood that the safety guard or shield 20 could be used on any type of skinning machine.

For purposes of description, the numeral 22 refers to the feed conveyor means mounted on the frame means 24 which is adapted to move the product towards the skinning blade. Feed conveyor means 22 includes a pair of spaced apart side frames 26 and 28 which support the rollers which in turn support the conveyor belt 30. The skinning and slashing machine is powered by a suitable power means such as an electric motor or the like which is not shown.

Slashing apparatus 16 generally comprises a pair of support arms 32 and 34 which are secured to shaft 36 at their lower ends. Shaft 36 is rotatably mounted on the frame means to permit the slashing apparatus 16 to be moved from the normal operating position illustrated by broken lines in FIG. 6 to the open or raised position illustrated by solid lines in FIG. 6. Shaft 36 is provided with an arcuate notch 38 provided in the periphery thereof which is in engagement with the roller 40 mounted on plunger arm 42 of switch 44. Thus, when the slashing apparatus 16 is in its normal operating position such as illustrated by the broken lines in FIG. 6, the roller 40 will be received by the notch 38 so that the switch 44, which is electrically connected to the power motor, will be closed. When the slashing apparatus 16 is pivotally moved to its upper position, shaft 36 is rotated which causes the plunger 42 to be moved inwardly into the switch 44 to open the same thereby deactivating the power motor.

The numeral 46 refers generally to a lock means of the plunger type which is mounted in the support arm 32 and which has a plunger 48 adapted to be received by an opening 50 formed in guide plate 52, which is secured to the side frame 26, when the slashing mechanism is moved to its raised position. As seen in FIG. 7, the lock means 46 is spring loaded so that the plunger 48 is normally yieldably urged outwardly therefrom. As the slashing apparatus 16 is pivotally moved upwardly, the plunger 48 engages the bent portion 53 of the guide 52 to cause the plunger 48 to slidably move inwardly into the lock means 46 until the plunger 48 registers with the opening 50 at which time the plunger 48 moves thereinto to lock the apparatus in its upper position. The apparatus 16 may be moved to its lower position by simply retracting the plunger 48 from the opening 50 and pivotally moving the apparatus 16 to the broken line position of FIG. 6.

Safety shield 18 comprises a pair of side frames 54 and 56 having bars 58 and 60 secured to the ends thereof and extending therebetween as seen in the drawings. The numeral 62 refers to a transparent shield member which is bent generally in the form of an inverted triangle and which has its lower edges secured to bars 58 and 60 by grommet supports 64 and 66 respectively. The frames 54 and 56 are secured to the upper ends of support arms 32 and 34 by suitable pins, screws of bolts extending therethrough. The transparent shield member 62 is provided with cut-out portions 68 and 70 formed in its opposite side walls which merely facilitate the shield member being bent to the configuration seen in the drawings.

Figure 3:
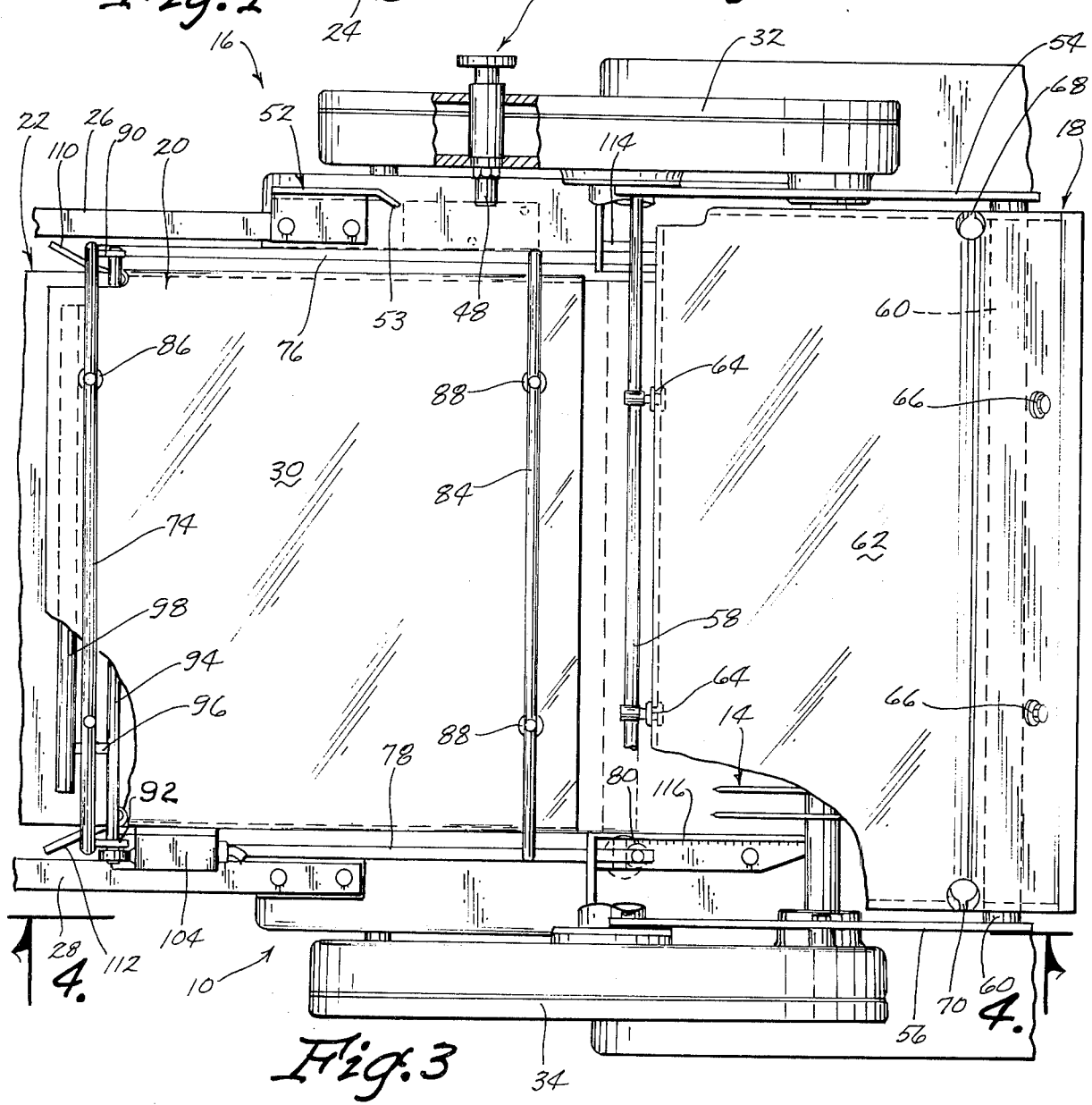
FIG. 3 is a partial top elevational view of the machine with portions thereof cut-away to more fully illustrate the invention.
Figure 4:
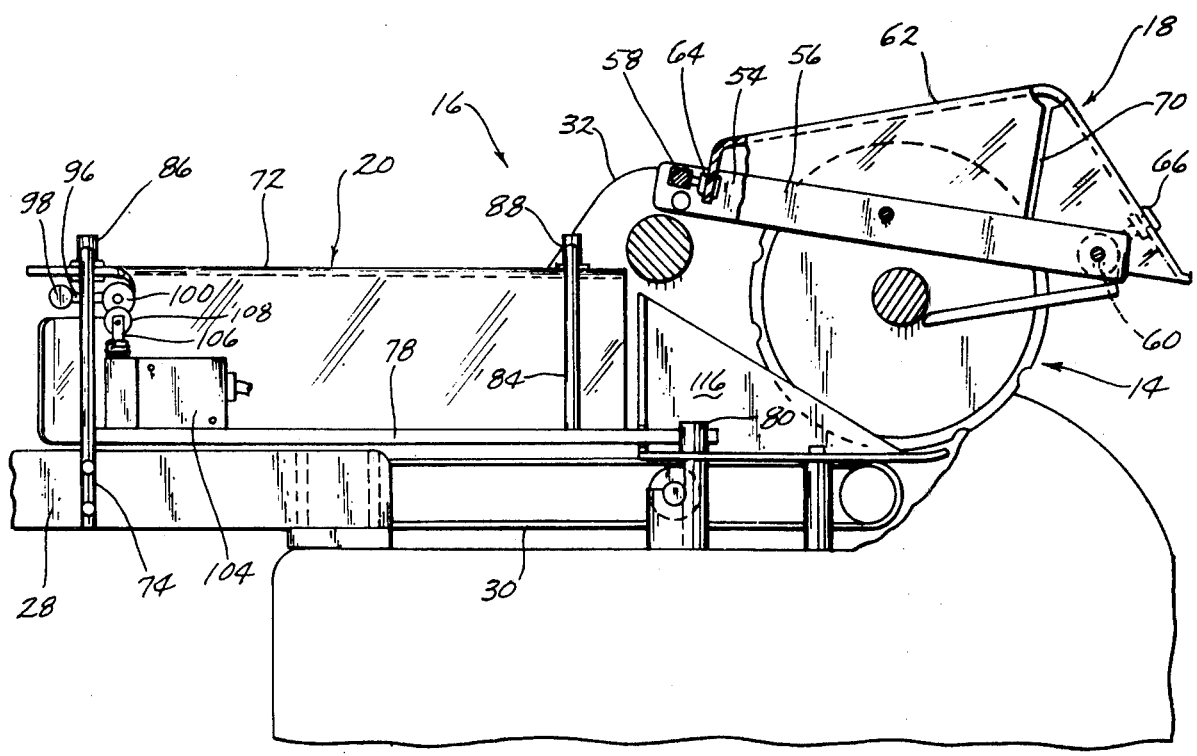
FIG. 4 is a sectional view seen on lines 4 — 4 of FIG. 3.
Figure 5:
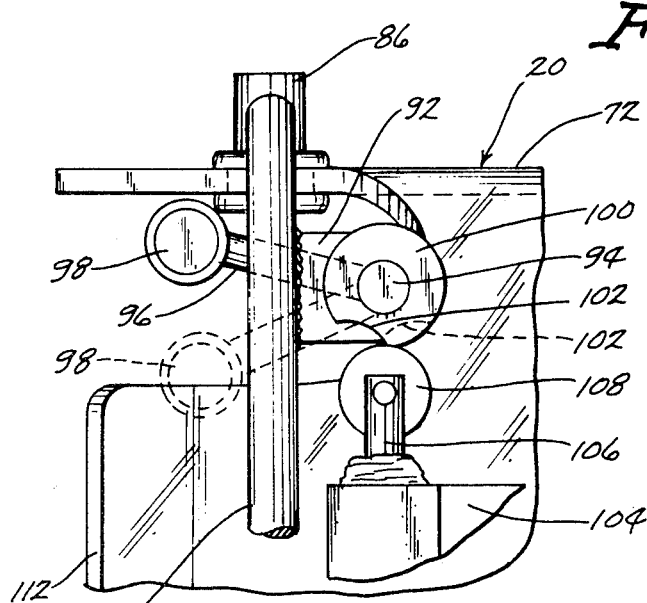
FIG. 5 is a partial side elevational view of the switch means at the feed end of the conveyor.

Safety guard 20 generally comprises an inverted U-shaped shield member or housing 72 which is secured to the frame means 24 by a support means referred to generally by the reference numeral 74. Support means 74 comprises an inverted U-shaped member 74 which has its lower ends secured to side frames 26 and 28 by bolts or the like. Horizontally disposed frame members 76 and 78 are secured at their forward ends to the legs of the member 74 and extend towards the skinning blade. The rearward ends of the frame members 76 and 78 are each secured to the frame means 24 by any convenient means such as collars 80 and 82 respectively. An inverted U-shaped member 84 is secured at its lower ends to the frame members 78 and 76 as illustrated in the drawings. Shield member 72 is generally inverted U-shaped and is secured to the U-shaped members 74 and 84 by grommet supports 86 and 88 respectively. Ears 90 and 92 are welded to the opposite legs of the member 74 and extend rearwardly therefrom as seen in the drawings. Shaft 94 is rotatably mounted in the ears 90 and 92 and extends therebetween as illustrated in FIG. 3. Fingers 96 are welded to shaft 94 and extend forwardly therefrom towards the feed end of the shield member 72. Safety bar 98 is secured to the forward ends of the fingers 96 and is positioned at the feed end of the shield member 72 as best illustrated in FIGS. 3 and 5. A switch actuator 100 is secured to one end of shaft 94 for rotation therewith as seen in FIG. 5 and has an arcuate notch 102 formed in the periphery thereof. Switch 104 is secured to frame member 78 and has a spring loaded plunger arm 106 extending upwardly therefrom having a roller 108 rotatably mounted on the upper end thereof which is adapted to be received by the notch 102. When the safety bar 98 is in its normal position such as illustrated in FIG. 4, roller 108 is received by the notch 102 so that the switch 104 is closed. If the bar 98 moves upwardly or downwardly so as to cause the rotation of shaft 94 and the actuator 100, plunger arm 106 will be moved downwardly into the switch 104 so as to deactivate the power motor to which the switch is electrically connected.

Shield member 72 is provided with guide portions 110 and 112 at its feed end as seen in FIG. 3. A pair of triangular guards 114 and 116 are positioned adjacent the forward outer edges of the slashing apparatus 14.

In normal operation, the apparatus would be in the position illustrated in FIGS. 2 and 4. Safety bar 98 would be in the position illustrated in FIG. 4 so that the switch means 104 would be closed and the support arms 32 and 34 would also be in their operating position so the switch means 44 would also be closed. The power source for the machine would be actuated which would cause the conveyor means 22 to be actuated as well as the skinning and slashing apparatus. The operator would place the meat product on the conveyor belt 30 and would guide the same forwardly towards the skinning and slashing apparatus beneath the transparent shield member 72. The shield member does not interfere with the normal operation of the machine until such time as the machine operator would happen to extend his hand or arm objectionably far into the shield member 72 which would cause the safety bar 98 to be either moved upwardly or downwardly thereby causing the actuator 100 to open the switch means 104 which would deactivate the power source. The transparent shield member permits the operator to visually observe the meat product as it is being moved towards the skinning and slashing apparatus.

The safety shield 18 prevents the operator from engaging the rotating slashing blades of the slashing apparatus and also prevents debris from the meat product being thrown towards the operator. If the slashing apparatus pivotally moves upwardly with respect to the machine, notch 38 on shaft 36 moves out of engagement with the roller 40 thereby causing the switch means 44 to deactivate the power source.

Figure 6:
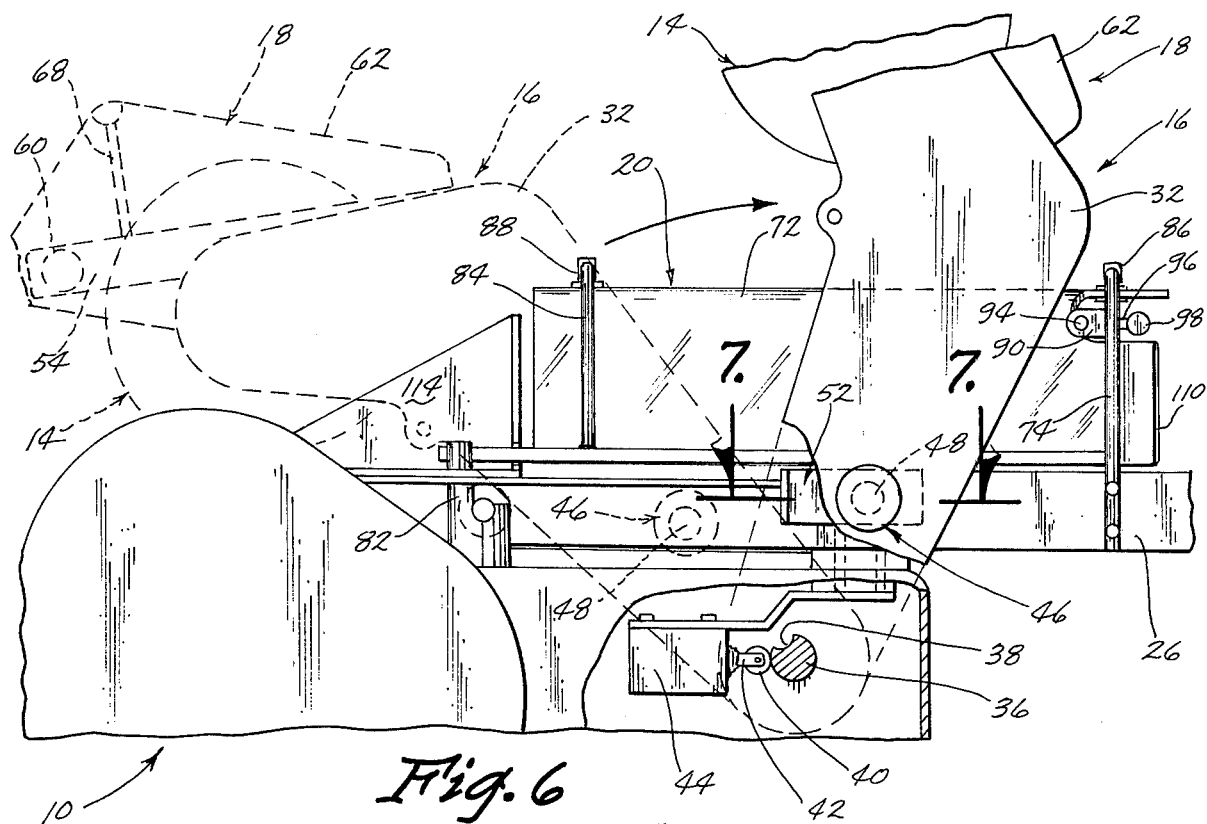
FIG. 6 is a partial side elevational view of the machine with portions thereof cut-away to more fully illustrate the invention.
Figure 7:
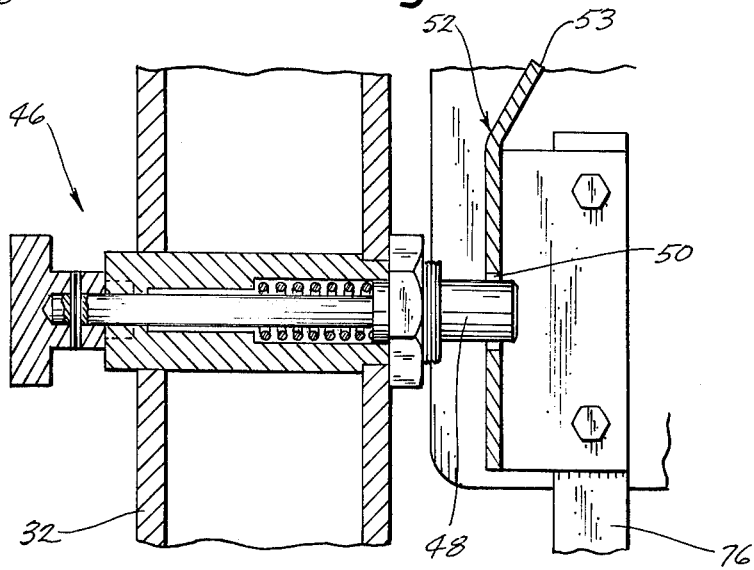
FIG. 7 is an enlarged sectional view seen on lines 7 — 7 of FIG. 6.

If it is necessary to inspect, repair or clean the machine, the support arms 32 and 34 may be pivotally moved upwardly with respect to the machine with the locking means 46 maintaining the slashing apparatus in the position illustrated by solid lines in FIG. 6 to prevent the apparatus from inadvertently falling onto the operator's hands or the like.

Thus it can be seen that the safety means of this invention prevents the machine operator from extending his hand or arm too far towards the skinning and slashing apparatus and quickly deactivates the power source upon the safety bar 98 being moved upwardly or downwardly. Thus it can be seen that a novel safety means has been provided for a skinning and/or slashing machine which prevents injury to the machine operator. The safety means of this invention does not interfere with the normal operation of the machine and quickly deactivates the machine upon objectionable movement thereof. It can therefore be seen that the safety means of this invention accomplishes at least all of its stated objectives.

I claim:

1. In combination with a skinning machine comprising a frame means having rearward and forward ends, a feed conveyor means at the forward end of said frame means, a skinning blade means at the rearward end of said feed conveyor means, and power means for operating said feed conveyor means, comprising, a housing means operatively secured to said frame means and extending over said feed conveyor means in a spaced relationship with respect thereto, a safety bar means operatively movably secured to said frame means at the forward end of said housing means, a first normally closed electrical switch means operatively mechanically connected to said safety bar means and electrically connected to said power means for deactivating said power means when said safety bar means is moved a predetermined amount relative to said housing means, said frame means comprising first and second spaced-apart frame members positioned at opposite ends of said feed conveyor means, said housing means comprising an inverted substantially U-shaped channel member having opposite sides positioned adjacent said frame members and a top portion extending between said opposite sides, and rearward and forward ends; said channel member being secured to said frame members, a first switch actuator operatively secured to said safety bar means, said switch means being operatively secured to one of said frame members and having a switch arm in operative engagement with said switch actuator whereby vertical movement in a predetermined amount of said safety bar means will cause said switch actuator to open said first switch means, means mounting the rearward end of said U-shaped channel member to said first frame member, means mounting the forward end of said U-shaped channel member to said second frame member, and said first switch means being operatively secured to said U-shaped member.

2. The combination of claim 1 wherein said skinning machine has an electrically powered rotating mechanism comprised of a plurality of rotating members mounted over said skinning blade, said first switch means also being electrically connected to said rotating mechanism to also deactivate said rotating mechanism when said safety bar means is moved said predetermined amount.

3. The combination of claim 2 wherein said rotating mechanism comprised a first and second support arms selectively pivotally secured at one end thereof to said frame means and extending upwardly therefrom, a plurality of rotatable rotating members operatively secured to and extending between the upper ends of said support arms, a second normally closed switch means on said frame means electrically connected to the power source of said rotating mechanism, and means on said support arms for opening said second switch means to deactivate the power source for said rotating mechanism upon said support arms being pivotally moved upwardly with respect to said frame means.

4. The combination of claim 1 wherein said skinning machine has an electrically powered slashing mechanism mounted over said skinning blade means, said first switch means also being electrically connected to said slashing mechanism to also deactivate said slashing mechanism when said safety bar means is moved said predetermined amount.

5. The combination of claim 1 wherein said housing means is transparent.

6. The combination of claim 1 wherein said switch actuator has an arcuate cut-out area formed in the forward end thereof, said first switch means having a roller means mounted on the switch arm thereof which is normally received by the cut-out area in said switch actuator.

7. The combination of claim 6 wherein a shaft is rotatably mounted about a horizontal axis adjacent the forward end of said housing means and rearwardly of said safety bar means, said safety bar means being secured to said shaft, said switch actuator being mounted on one end of said shaft for rotation therewith.

8. The combination of claim 2 wherein a safety shield is secured to and extends over said slashing mechanism.

9. In combination with a skinning machine comprising a frame means having rearward and forward ends, a feed conveyor means at the forward end of said frame means, a skinning blade means at the rearward end of said feed conveyor means, and power means for operating said feed conveyor means, comprising, a housing means operatively secured to said frame means and extending over said feed conveyor means in a spaced relationship with respect thereto, a safety bar means operatively movably secured to said frame means at the forward end of said housing means, and a first normally closed electrical switch means operatively mechanically connected to said safety bar means and electrically connected to said power means for deactivating said power means when said safety bar is moved a predetermined amount relative to said housing means, electrically powered slashing mechanism mounted over said skinning blade means, said first switch means also being electrically connected to said slashing mechanism to also deactivate said slashing mechanism when said safety bar means is moved said predetermined amount, said slashing mechanism comprising, first and second support arms selectively pivotally secured at one end thereof to said frame means and extending upwardly therefrom, a plurality of rotatable slashing blades operatively secured to and extending between the upper ends of said support arms, a second normally closed switch means on said frame means electrically connected to the power source of said slashing mechanism, and means on said support arm for opening said second switch means to deactivate the power source for said slashing mechanism upon said support arms being pivotally moved upwardly with respect to said frame means.

10. The combination of claim 9 wherein a second shaft means is rotatably mounted on said frame means, said support arms being secured at their lower ends to said second shaft means, said second shaft means having a switch actuator means thereon adapted to close and open said second switch means upon rotation of said second shaft means.

11. The combination of claim 9 wherein said support arms are pivotally movable between upper and lower positions, and wherein a lock means is mounted on said frame means for locking said support arms in their upper positions.

12. The combination of claim 11 wherein said lock means automatically locks said support arms in their upper positions.

13. In combination, a skinning and slashing machine comprising a frame means having rearward and forward ends, a skinning blade means on said machine, a slashing mechanism mounted over said blade means, a shield means mounted over said slashing mechanism, power means for powering said blade means and said slashing mechanism, said slashing mechanism comprising a pair of support arms pivotally connected to said frame means at one end thereof extending upwardly therefrom, a plurality of slashing blades rotatably mounted on the upper ends of said support arms, said support arms being pivotally movable between first and second positions relative to said frame means, a normally closed switch means on said machine electrically connected to said power means, and actuator means on said slashing mechanism for opening said switch means when said support arms are raised from their said first position to their said second position.

14. The combination of claim 13 wherein said shield means is transparent.

15. The combination of claim 13 wherein said shield means is triangular shaped.

16. The combination of claim 13 wherein the lower ends of said support arms are mounted on a rotatable shaft means, said shaft means having said actuator means thereon for engagement with said switch means.

17. The combination of claim 13 wherein a lock means is provided on said frame means for locking said support arms in their said second position.

* * * * *